United States Patent
Yamanaka

(10) Patent No.: US 8,925,938 B2
(45) Date of Patent: Jan. 6, 2015

(54) VEHICLE STEERING SYSTEM

(71) Applicant: JTEKT Corporation, Osaka (JP)

(72) Inventor: Kosuke Yamanaka, Kashihara (JP)

(73) Assignee: JTEKT Corporation, Osaka (JP)

( * ) Notice: Subject to any disclaimer, the term of this patent is extended or adjusted under 35 U.S.C. 154(b) by 143 days.

(21) Appl. No.: 13/675,529

(22) Filed: Nov. 13, 2012

(65) Prior Publication Data

US 2013/0118289 A1    May 16, 2013

(30) Foreign Application Priority Data

Nov. 16, 2011   (JP) ................................. 2011-250724

(51) Int. Cl.
| | |
|---|---|
| *B62D 3/12* | (2006.01) |
| *B62D 1/16* | (2006.01) |
| *F16H 55/26* | (2006.01) |
| *B62D 5/00* | (2006.01) |
| *B62D 5/04* | (2006.01) |
| *B66F 9/075* | (2006.01) |

(52) U.S. Cl.
CPC .. *B62D 1/16* (2013.01); *B62D 3/12* (2013.01); *F16H 55/26* (2013.01); *B62D 5/001* (2013.01); *B62D 5/0427* (2013.01); *B62D 5/0448* (2013.01); *B66F 9/07568* (2013.01)
USPC ................... 280/93.514; 74/388 PS

(58) Field of Classification Search
CPC .......... B62D 3/12; F16H 55/26; F16H 55/285
USPC ................. 74/388 PS, 496, 498; 280/93.514; 180/6.38
See application file for complete search history.

(56) References Cited

U.S. PATENT DOCUMENTS

| | | | | |
|---|---|---|---|---|
| 3,074,735 | A * | 1/1963 | Ulrich | 280/93.514 |
| 6,000,267 | A * | 12/1999 | Yagi | 72/189 |
| 6,039,334 | A * | 3/2000 | Ozeki | 280/93.514 |
| 6,467,365 | B1 * | 10/2002 | Jorg et al. | 74/422 |
| 6,845,993 | B2 * | 1/2005 | Shirai | 280/93.514 |
| 7,461,571 | B2 * | 12/2008 | Tanaka | 74/388 PS |

(Continued)

FOREIGN PATENT DOCUMENTS

| | | |
|---|---|---|
| DE | 101 42 599 A1 | 4/2003 |
| DE | 10 2006 025 8 A1 | 12/2007 |
| DE | 10 2007 015 3 A1 | 10/2008 |
| JP | A-2008-137473 | 6/2008 |

OTHER PUBLICATIONS

Oct. 2, 2014 extended European Search Report issued in Application No. 12192527.5.

*Primary Examiner* — Nicole Verley
(74) *Attorney, Agent, or Firm* — Oliff PLC

(57) ABSTRACT

A vehicle steering system includes a steered shaft, and stoppers which restrict an amount of movement of the steered shaft in an axial direction. The steered shaft has first outer peripheral faces, second outer peripheral faces, and annular stepped portions. Each stepped portion includes a contact portion that faces a corresponding one of the stoppers in the axial direction, a first corner portion that has a concave curved sectional shape and connects the first outer peripheral face to an inner end of the contact portion, and a second corner portion that has a concave curved sectional shape with a larger curvature radius than that of the first corner portion, and connects the first outer peripheral face to the second outer peripheral face, at a position in front of or behind a central axis of the steered shaft.

5 Claims, 6 Drawing Sheets

(56) References Cited

U.S. PATENT DOCUMENTS

| | | | |
|---|---|---|---|
| 7,654,165 B2* | 2/2010 | Roeske | 74/388 PS |
| 8,205,897 B2* | 6/2012 | Avigni | 280/93.514 |
| 8,376,379 B2* | 2/2013 | Park et al. | 280/93.514 |
| 8,479,605 B2* | 7/2013 | Shavrnoch et al. | 74/388 PS |
| 8,613,459 B2* | 12/2013 | Yang et al. | 280/93.514 |
| 8,708,357 B2* | 4/2014 | Sumihara | 280/93.514 |
| 2002/0139207 A1* | 10/2002 | Stoll et al. | 74/422 |
| 2007/0216125 A1* | 9/2007 | Baxter | 280/93.514 |
| 2013/0340554 A1* | 12/2013 | Nomura et al. | 74/422 |

* cited by examiner

US 8,925,938 B2

VEHICLE STEERING SYSTEM

INCORPORATION BY REFERENCE/RELATED APPLICATION

This application claims priority to Japanese Patent Application No. 2011-250724 filed on Nov. 16, 2011 the disclosure of which, including the specification, drawings and abstract, is incorporated herein by reference in its entirety.

BACKGROUND OF THE INVENTION

1. Field of the Invention

The invention relates to a vehicle steering system.

2. Discussion of Background

A vehicle steering system includes a steered shaft that moves in its axial direction in response to an operation of a steering wheel, and a tubular housing that covers the steered shaft. Wheels are coupled to respective end portions of the steered shaft via joints, tie rods and the like. The end portions of the steered shaft, the joints, the tie rods and the like project from the housing, and are covered with bellows.

Japanese Patent Application Publication No. 2008-137473 (JP 2008-137473 A) describes a rack for a steering system. According to JP 2008-137473 A, rack ends, which are fixed to respective end portions of a steered shaft having the rack and which are larger in diameter than the steered shaft, come into contact with corresponding stoppers arranged in a housing, thereby restricting the amount of movement of the steered shaft.

In a material-handling vehicle such as a fork lift, a tie rod angle (an angle formed by a steered shaft and each tie rod in a planar view) is larger than that in an ordinary vehicle. Therefore, it is not possible to provide bellows because they would fail to expand and contract in accordance with the movement of the tie rod. This creates the possibility that foreign matter, for example, gravels will be caught between the rack ends and the stoppers. In order to avoid this possibility, stepped portions may be formed in a steered shaft at sections that are located in a housing, and the stepped portions may be brought into contact with corresponding stoppers of the housing to restrict the amount of movement of the steered shaft. However, if a bending load is applied to the steered shaft that has the stepped portions, stress concentration may occur at the stepped portions and large stress may be generated at the stepped portions.

SUMMARY OF THE INVENTION

The invention provides a vehicle steering system in which stepped portions are formed in a steered shaft and stress concentration is suppressed.

According to a feature of an example of the invention, a vehicle steering system includes: a steered shaft that moves in an axial direction of the steered shaft in response to an operation of a steering member; and a stopper that comes into contact with the steered shaft to restrict an amount of movement of the steered shaft in the axial direction, the steered shaft has a first outer peripheral face, a second outer peripheral face that is larger in diameter than the first outer peripheral face and that is coaxial with the first outer peripheral face, and a stepped portion that connects the first outer peripheral face to the second outer peripheral face, and the stepped portion has a contact portion that faces the stopper in the axial direction, a first corner portion that has a concave curved sectional shape, and that connects the first outer peripheral face to an inner end of the contact portion, and a second corner portion that has a concave curved sectional shape with a curvature radius larger than a curvature radius of the first corner portion, that is formed in at least one of a position in front of a central axis of the steered shaft and a position behind the central axis in a longitudinal direction of a vehicle, the position being different from a position of the first corner portion in a circumferential direction of the steered shaft, and that connects the first outer peripheral face to the second outer peripheral face.

BRIEF DESCRIPTION OF THE DRAWINGS

The foregoing and further objects, features and advantages of the invention will become apparent from the following description of example embodiment with reference to the accompanying drawings, wherein like numerals are used to represent like elements, and wherein.

DETAILED DESCRIPTION OF EMBODIMENTS

Hereinafter, an embodiment of the invention will be described with reference to the accompanying drawings.

Figure 1:
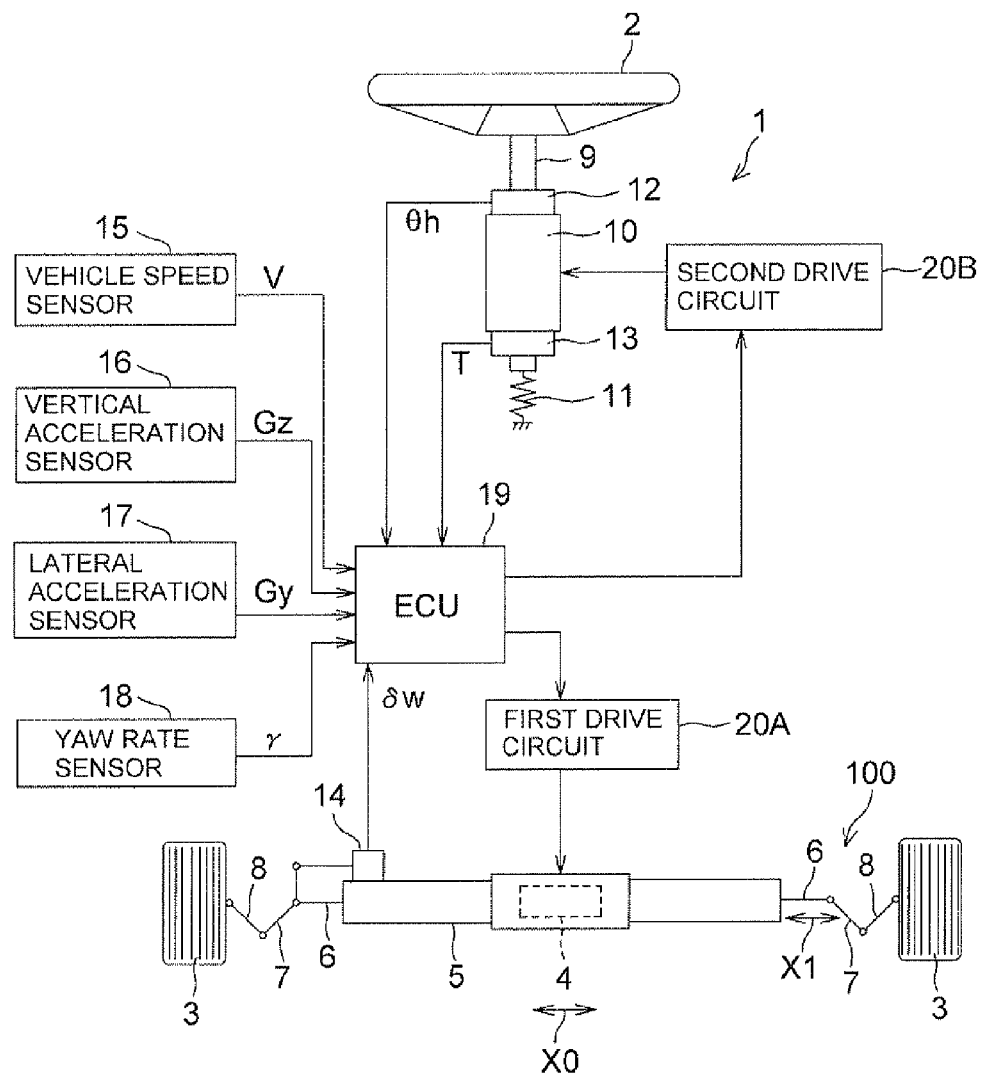
FIG. 1 is a view showing the schematic configuration of a vehicle steering system according to an embodiment of the invention.

FIG. 1 is a view showing the schematic configuration of a vehicle steering system 1 according to an embodiment of the invention. The vehicle steering system 1 is, for example, a vehicle steering system of a steer-by-wire type in which a steering wheel 2 is not mechanically coupled to a steering mechanism 100. The vehicle steering system 1 includes a steering shaft 9 to which the steering wheel 2 is coupled and which may function as a steering member, the steering mechanism 100 that steers steered wheels 3 in response to an operation of the steering wheel 2, and an electronic control unit (ECU) 19 that functions as a control unit that controls the steering mechanism 100 in response to the operation of the steering wheel 2. The vehicle steering system 1 further includes a reaction force actuator 10 that applies a reaction force to the steering wheel 2, and an elastic member 11 that returns the steering wheel 2 to a straight-ahead travelling position (steering neutral position).

The steering shaft 9 is supported so as to be rotatable relative to a vehicle body. One end portion of the steering shaft 9 is coupled to the steering wheel 2, and the other end portion of the steering shaft 9 is coupled to the elastic member 11. The reaction force actuator 10 is coupled to an intermediate portion of the steering shaft 9. The reaction force actuator 10 includes a motor that has a rotor coupled to the steering shaft 9. The elastic member 11 includes a coil spring. When the steering wheel 2 is operated, a force for returning the steering wheel 2 to the straight-ahead travelling position (restoring force of the elastic member 11) is applied to the steering shaft 9.

The steering mechanism 100 includes a steered shaft 6 that extends in a vehicle lateral direction X0, a tubular steered housing 5 that houses the steered shaft 6, and a steered system actuator 4 that drives the steered shaft 6. In the present embodiment, the steering mechanism 100 is attached to the vehicle body such that the vehicle lateral direction X0 coincides with an axial direction X1 of the steered shaft 6. The steered shaft 6 is supported by the steered housing 5. The steered housing 5 is fixed to a vehicle body-side member. The steered shaft 6 is movable in the lateral direction X0 relative to the steered housing 5. End portions of the steered shaft 6 are coupled to the steered wheels 3 via tie rods 7 and knuckle arms 8. The steered system actuator 4 includes an electric motor as described later. The rotation of the steered system actuator 4 is converted into a movement of the steered shaft 6 in the axial direction X1 by a movement conversion mechanism that will be described later. The right and left steered wheels 3 are steered in accordance with an axial movement of the steered shaft 6.

The vehicle steering system 1 further includes a steering angle sensor 12 that detects a steering angle θh of the steering wheel 2, a torque sensor 13 that detects a steering torque T applied to the steering wheel 2, and a steered angle sensor 14 that detects a steered angle δw (the tire angle) of the steered wheel 3. The sensors 12 to 14 are connected to the ECU 19. In addition to the sensors 12 to 14, a vehicle speed sensor 15 that detects a vehicle speed V, a vertical acceleration sensor 16 that serves as a rough road state detection sensor that detects a vertical acceleration Gz of the vehicle body, a lateral acceleration sensor 17 that detects a lateral acceleration Gy of a vehicle, and a yaw rate sensor 18 that detects a yaw rate y of the vehicle are connected to the ECU 19. Detection values from the sensors 12 to 18 are input into the ECU 19. The ECU 19 controls the vehicle steering system 1 on the basis of the detection values from the sensors 12 to 18.

Specifically, the ECU 19 sets a target steered angle on the basis of the steering angle θh detected by the steering angle sensor 12 and the vehicle speed V detected by the vehicle speed sensor 15, and controls the steered system actuator 4 (executes steered operation control) via a first drive circuit 20A on the basis of a difference between the target steered angle and the steered angle δw detected by the steered angle sensor 14. As a result, the steered wheels 3 are steered on the basis of the steering angle θh of the steering wheel 2. In addition, the ECU 19 controls the reaction force actuator 10 (executes reaction force control) via a second drive circuit 20B on the basis of detection signals output by the sensors 12 to 18. As a result, the reaction force of the reaction force actuator 10 is transmitted to an operator who operates the steering wheel 2.

Figure 2:
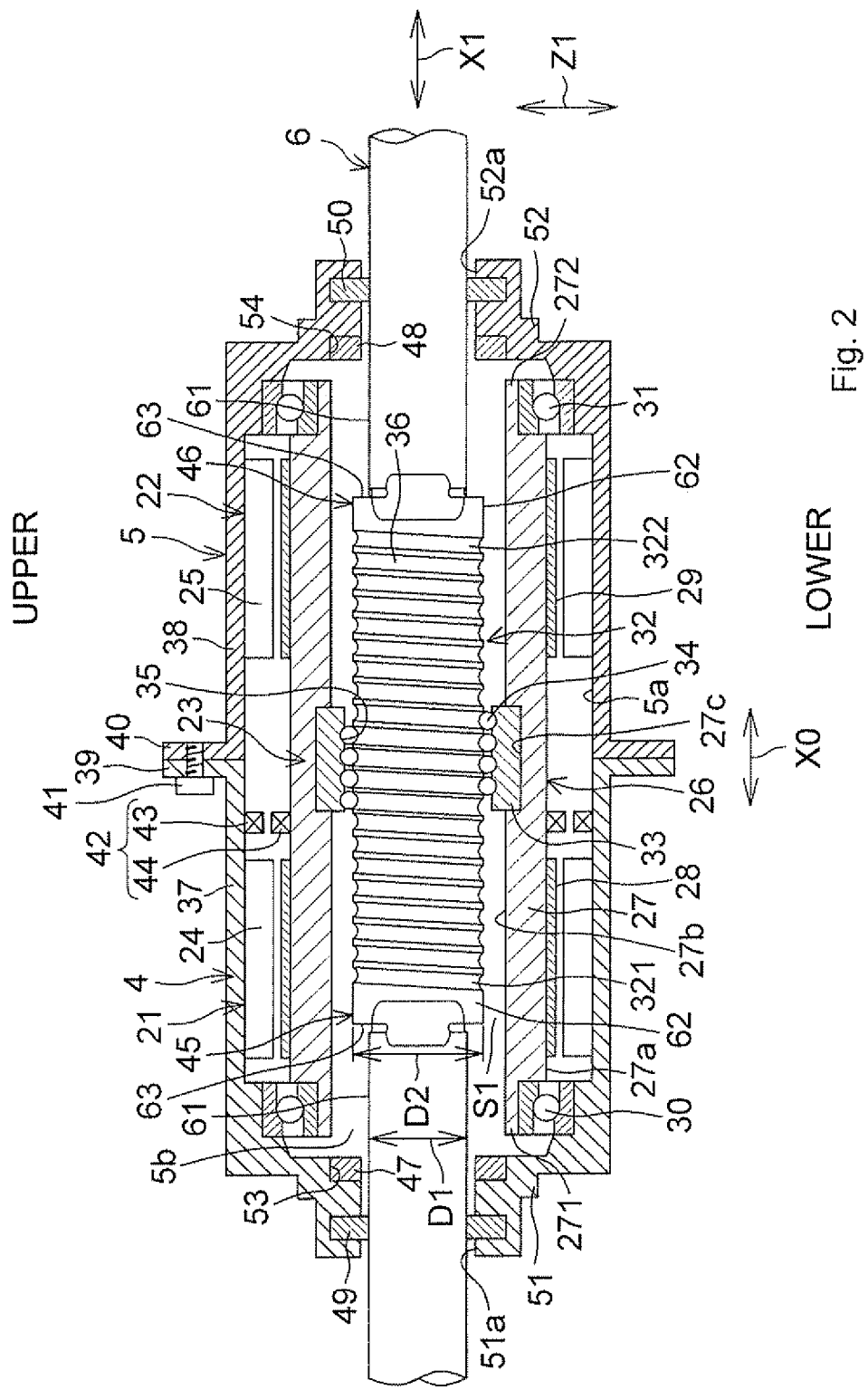
FIG. 2 is a schematic sectional view of a mechanism that drives a steered shaft.

FIG. 2 is a schematic sectional view of a mechanism that drives the steered shaft 6. An intermediate portion of the steered shaft 6 in the axial direction X1 is inserted in the tubular steered housing 5. Between an inner periphery 5a of the steered housing 5 and the steered shaft 6, there are arranged a first electric motor 21 and a second electric motor 22 that constitute the steered system actuator 4, and a ball screw mechanism 23 that serves as a movement conversion mechanism that converts rotations output from the motors 21, 22 into an axial movement of the steered shaft 6.

The first electric motor 21 and the second electric motor 22 are arranged side by side in the axial direction X1 of the steered shaft 6 in the steered housing 5. The first electric motor 21 includes a first stator 24 fixed to the inner periphery 5a of the steered housing 5, and the second electric motor 22 includes a second stator 25 fixed to the inner periphery 5a of the steered housing 5. The first electric motor 21 and the second electric motor 22 share a common rotor 26 that surrounds the periphery of the steered shaft 6.

The rotor 26 includes a cylindrical rotor core 27 that surrounds the periphery of the steered shaft 6, and a first permanent magnet 28 and a second permanent magnet 29 fitted to an outer periphery 27a of the rotor core 27 so as to be rotatable together with the rotor core 27. The first permanent magnet 28 and the second permanent magnet 29 are arranged side by side in the axial direction X1. The first permanent magnet 28 faces the first stator 24, and the second permanent magnet 29 faces the second stator 25.

The steered housing 5 has a first end portion 51 and a second end portion 52. A first end portion 271 of the rotor core 27 is rotatably supported by a first bearing 30 supported by the first end portion 51 of the steered housing 5. A second end portion 272 of the rotor core 27 is rotatably supported by a second bearing 31 supported by the second end portion 52 of the steered housing 5. The axial movement of each of outer rings of the first bearing 30 and the second bearing 31 relative to the steered housing 5 is restricted. The axial movement of each of inner rings of the first bearing 30 and the second bearing 31 relative to the rotor core 27 is restricted. As a result, the axial movement of the rotor core 27 relative to the steered housing 5 is restricted.

A rotation angle sensor 42 that detects a rotation angle of the rotor 26 is disposed in the steered housing 5. The rotation angle sensor 42 is, for example, a resolver. The rotation angle sensor 42 includes a sensor stator 43 fixed to the inner periphery 5a of the steered housing 5, and a sensor rotor 44 coupled to the outer periphery of the rotor 26 (the outer periphery 27a of the rotor core 27) so as to be rotatable together with the rotor 26.

The ball screw mechanism 23 includes a ball screw 32 formed at an intermediate portion of the steered shaft 6 in the axial direction X1, a ball nut 33 that surrounds the periphery of the ball screw 32, and a plurality of balls 34. The balls 34 are interposed between a spiral thread groove 35 (internal thread groove) formed in the inner periphery of the ball nut 33 and a spiral thread groove 36 (external thread groove) formed in the outer periphery of the ball screw 32.

The ball nut 33 is fitted to an inner periphery 27b of the rotor core 27 so as to be rotatable together with the rotor core 27. The ball nut 33 is fitted in a recess 27c formed in the inner periphery 27b of the rotor core 27. As a result, the axial movement of the ball nut 33 relative to the rotor core 27 is restricted. As described above, the axial movement of the rotor core 27 relative to the steered housing 5 is restricted via the first bearing 30 and the second bearing 31. Therefore, the axial movement of the ball nut 33 relative to the steered housing 5 is restricted.

In this way, the ball nut 33 is supported by the rotor 26. The rotor 26 is supported by the steered housing 5 via the first bearing 30 and the second bearing 31. The ball screw 32 is supported by the ball nut 33 via the plurality of balls 34. Therefore, the ball screw 32 is supported by the steered housing 5 via the ball nut 33 and the like. The ball screw 32 is formed in the steered shaft 6. Therefore, the steered shaft 6 is supported by the steered housing 5 via the ball nut 33 and the like. The rotation of the steered shaft 6 about its central axis of the steered housing 5 is restricted.

The steered housing 5 is formed by assembling a first housing 37 and a second housing 38 together. Specifically, a first annular flange 39 of the first housing 37 and a second annular flange 40 of the second housing 38 fitted together.

The first annular flange 39 and the second annular flange 40 are fastened together with a screw 41. As a result, the first housing 37 and the second housing 38 are coupled to each other. Because the flanges 39, 40 are fastened by the screw 41, a preload is applied from the first housing 37 and the second housing 38 to the first bearing 30 and the second bearing 31.

Between the maximum outer diameter portion of the outer peripheral face of the ball screw 32 of the steered shaft 6 and the inner periphery 27b of the rotor 26, a radial space S1 is formed. Therefore, as the steered shaft 6 moves in the axial direction X1, the ball screw 32 is able to smoothly move in the rotor core 27.

A first seal 49 that seals a space between the steered housing 5 and the steered shaft 6 is attached to the first end portion 51 of the steered housing 5. A second seal 50 that seals a space between the steered housing 5 and the steered shaft 6 is attached to the second end portion 52 of the steered housing 5. In the axial direction X1 of the steered shaft 6, an inner space 5b of the steered housing 5, which is defined between the first seal 49 and the second seal 50, is hermetically sealed. The first seal 49 hermetically seals the inner space 5b of the steered housing 5 while allowing relative movement between the steered housing 5 and the steered shaft 6 in the axial direction X1. Similarly, the second seal 50 hermetically seals the inner space 5b of the steered housing 5 while allowing the relative movement between the steered housing 5 and the steered shaft 6 in the axial direction X1.

When the steered system actuator 4 is driven, the rotor 26 and the ball nut 33 rotate together with each other. The rotation is converted into a linear movement by the ball screw mechanism 23. That is, as described above, the movement of the ball nut 33 in the axial direction X1 is restricted, and the rotation of the steered shaft 6 about its central axis is restricted. Consequently, when the ball nut 33 rotates, the steered shaft 6 linearly moves in the axial direction X1. As a result, the right and left steered wheels 3 (see FIG. 1) are steered.

The vehicle steering system 1 includes a stopper structure that restricts the amount of axial movement of the steered shaft 6. This stopper structure includes a first stepped shaft 45 and a second stepped shaft 46 formed in the steered shaft 6. The stopper structure further includes a first stopper 47 and a second stopper 48 disposed in the steered housing 5.

The stopper structure will be described with reference to FIG. 2. The steered shaft 6 has the first stepped shaft 45 and the second stepped shaft 46 arranged on left and right sides of the ball screw 32. The first stepped shaft 45 is adjacent to a first end portion 321 of the ball screw 32, and the second stepped shaft 46 is adjacent to a second end portion 322 of the ball screw 32. The first stepped shaft 45, the second stepped shaft 46 and the ball screw 32 are coaxially with each other, and formed as a single-piece member made of a single material.

The first stepped shaft 45 has a first outer peripheral face 61 with a relatively small diameter, a second outer peripheral face 62 with a relatively large diameter, and an annular stepped portion 63. The first outer peripheral face 61 and the second outer peripheral face 62 are coaxial with each other, and are arranged side by side with a gap in the axial direction X1. The stepped portion 63 connects the first outer peripheral face 61 to the second outer peripheral face 62. The first outer peripheral face 61 and the second outer peripheral face 62 are arranged side by side in the axial direction X1 of the steered shaft 6 in this order from the outside in the axial direction X1.

The first outer peripheral face 61 and the second outer peripheral face 62 are cylindrical faces, and extend in the axial direction X1. The first outer peripheral face 61 is passed through an insertion hole 51a formed in the first end portion 51 of the steered housing 5, and the second outer peripheral face 62 is adjacent to the ball screw 32. A diameter D2 of the second outer peripheral face 62 is larger than a diameter D1 of the first outer peripheral face 61, and is substantially equal to, for example, the outer diameter of the ball screw 32.

The second stepped shaft 46 has a configuration similar to that of the first stepped shaft 45. That is, the second stepped shaft 46 has a shape obtained by reversing the first stepped shaft 45 in the lateral direction (the vehicle lateral direction X0). Therefore, the second stepped shaft 46 has a first outer peripheral face 61, a second outer peripheral face 62, and a stepped portion 63. The first outer peripheral face 61 of the second stepped shaft 46 is passed through an insertion hole 52a formed in the second end portion 52 of the steered housing 5.

The stepped portion 63 of the first stepped shaft 45 is located in the inner space 5b of the steered housing 5, and located inward of the first stopper 47 in the vehicle lateral direction X0. Similarly, the stepped portion 63 of the second stepped shaft 46 is located in the inner space 5b of the steered housing 5, and located inward of the second stopper 48 in the vehicle lateral direction X0. Moreover, the first stopper 47 is disposed inward of the first seal 49 in the vehicle lateral direction X0. Similarly, the second stopper 48 is disposed inward of the second seal 50 in the vehicle lateral direction X0. Therefore, the stepped shafts 45, 46 and the stoppers 47, 48 are arranged in the inner space 5b of the steered housing 5, which is sealed by the first seal 49 and the second seal 50.

Figure 3A:
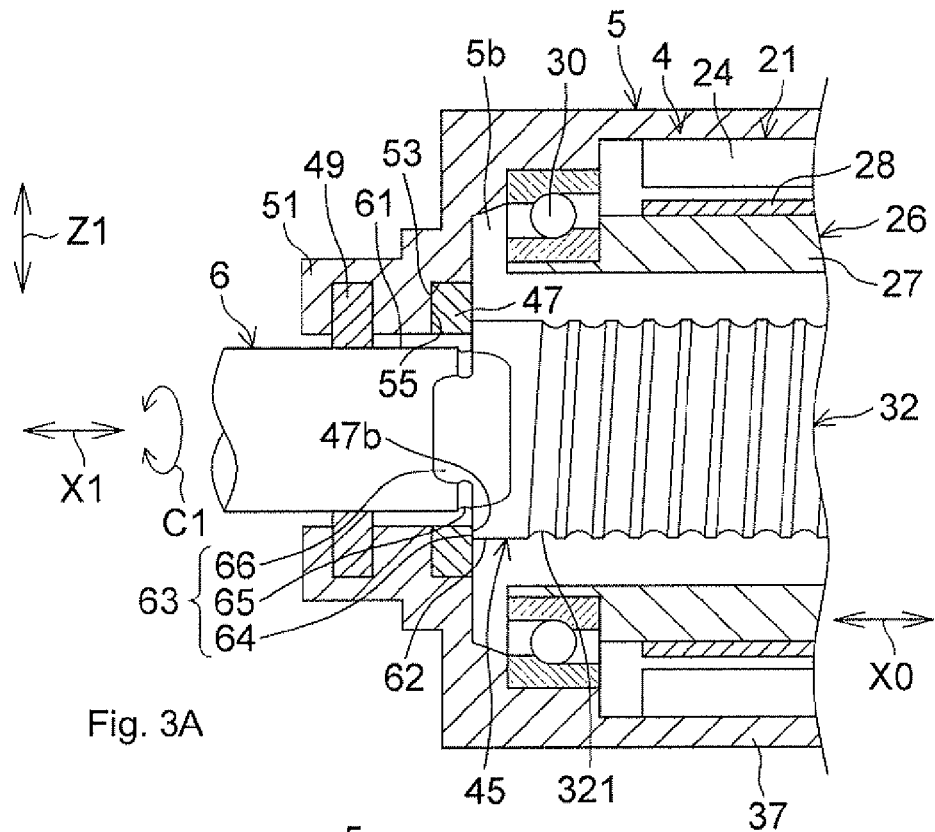
FIG. 3A and FIG. 3B are sectional views of main portions of the vehicle steering system, showing the state where movement of the steered shaft is restricted.
Figure 3B:
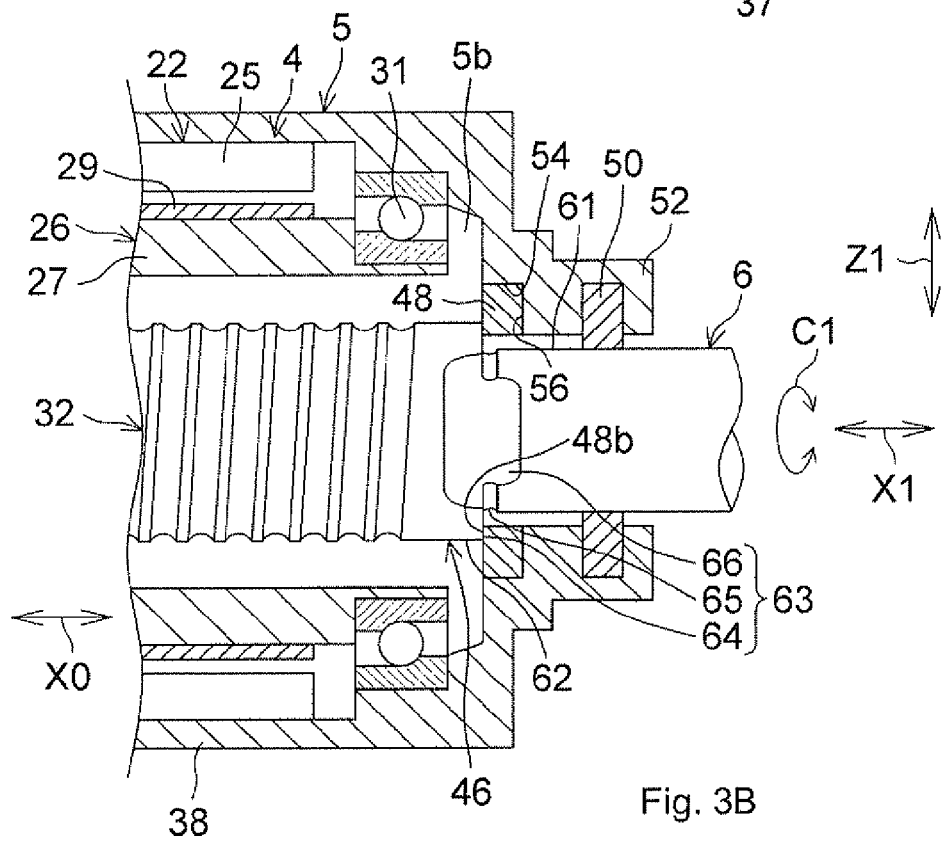

FIG. 3A and FIG. 3B are sectional views of main portions of the vehicle steering system 1, showing the state where the movement of the steered shaft 6 is restricted. As shown in FIG. 3A, the first end portion 51 of the steered housing 5 has a fitting face 53 to which the outer peripheral face of the first stopper 47 is fitted, and a receiving portion 55 that receives the first stopper 47 in the axial direction X1.

The stepped portion 63 of the first stepped shaft 45 has a pair of contact portions 64 that face the first stopper 47 in the axial direction X1, a pair of first corner portions 65 that have a concave curved sectional shape and are continuous with radially inner sides of the respective contact portions 64, and a pair of second corner portions 66 that have a concave curved sectional shape. The first corner portions 65 and the second corner portions 66 are alternately arranged in a circumferential direction C1 of the steered shaft 6.

When the steered shaft 6 moves toward one side (e.g., the left side in FIG. 3A) in the axial direction X1, the contact portions 64 of the stepped portion 63 of the first stepped shaft 45 come into contact with an end face 47b that serves as a contact face of the first stopper 47. As a result, the amount of movement of the steered shaft 6 in the axial direction X1 is restricted. The contact portions 64 and the end face 47b are faces that are perpendicular to the axial direction X1.

As shown in FIG. 3B, the second end portion 52 of the steered housing 5 has a fitting face 54 to which the outer peripheral face of the second stopper 48 is fitted, and a receiving portion 56 that receives the second stopper 48 in the axial direction X1. The stepped portion 63 of the second stepped shaft 46 has a configuration similar to that of the stepped portion 63 of the first stepped shaft 45. That is, the stepped portion 63 of the second stepped shaft 46 has a shape obtained by laterally reversing the stepped portion 63 of the first stepped shaft 45. Therefore, the stepped portion 63 of the second stepped shaft 46 has a pair of contact portions 64 that face the second stopper 48 in the axial direction X1, a pair of first corner portions 65, and a pair of second corner portions 66.

When the steered shaft 6 moves to the other side (e.g., the right sight in FIG. 3B) in the axial direction X1, the contact portions 64 of the stepped portion 63 of the second stepped shaft 46 come into contact with an end face 48b that serves as a contact face of the second stopper 48. As a result, the amount of movement of the steered shaft 6 in the axial direction X1 is restricted. The contact portions 64 and the end face 48b are faces that are perpendicular to the axial direction X1.

Figure 4:
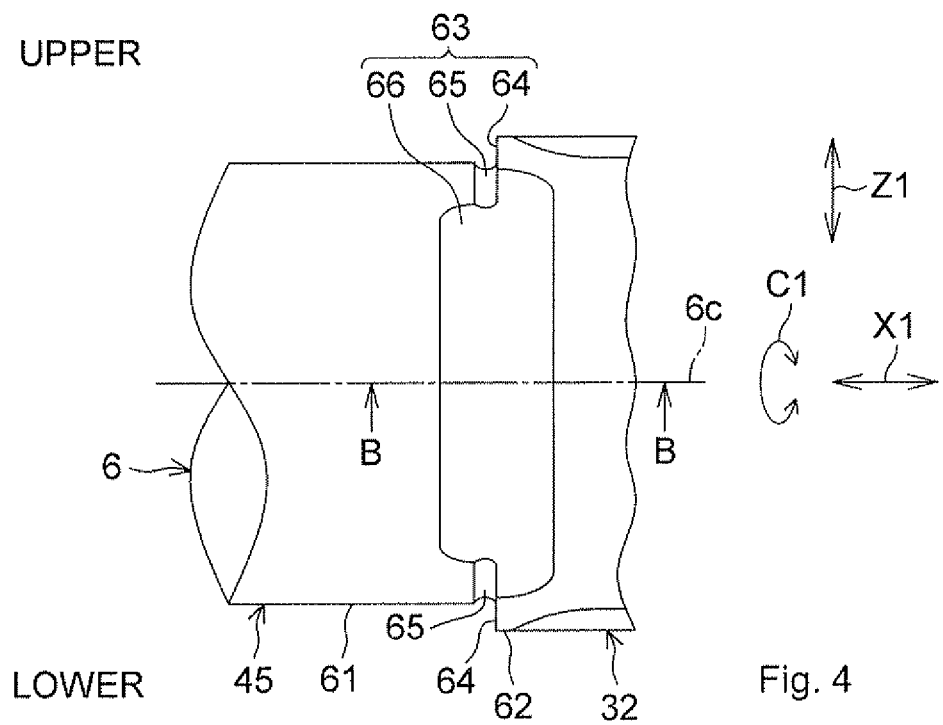
FIG. 4 is a front view of a stepped portion and its surrounding portions of the steered shaft.
Figure 5:
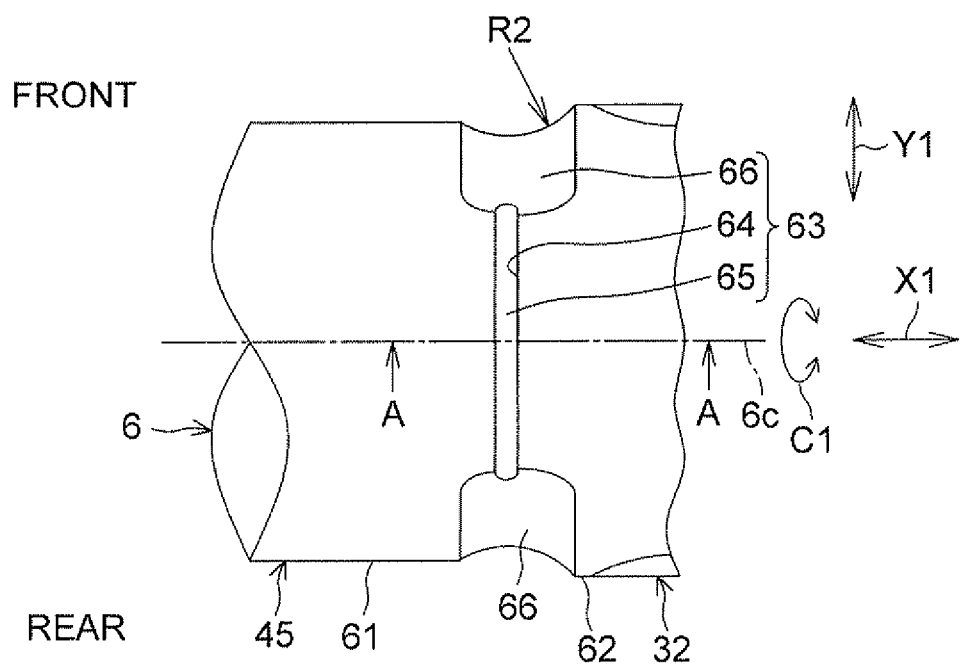
FIG. 5 is a plan view of the stepped portion and its surrounding portions of the steered shaft.
Figure 6:
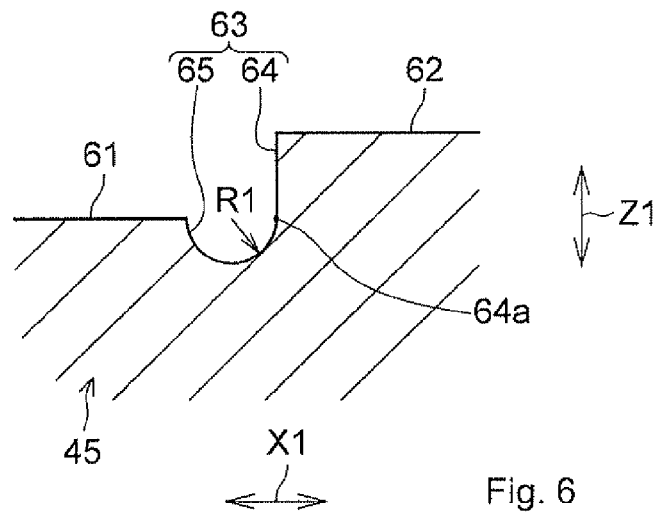
FIG. 6 is a sectional view taken along the line A-A in FIG. 5.
Figure 7:
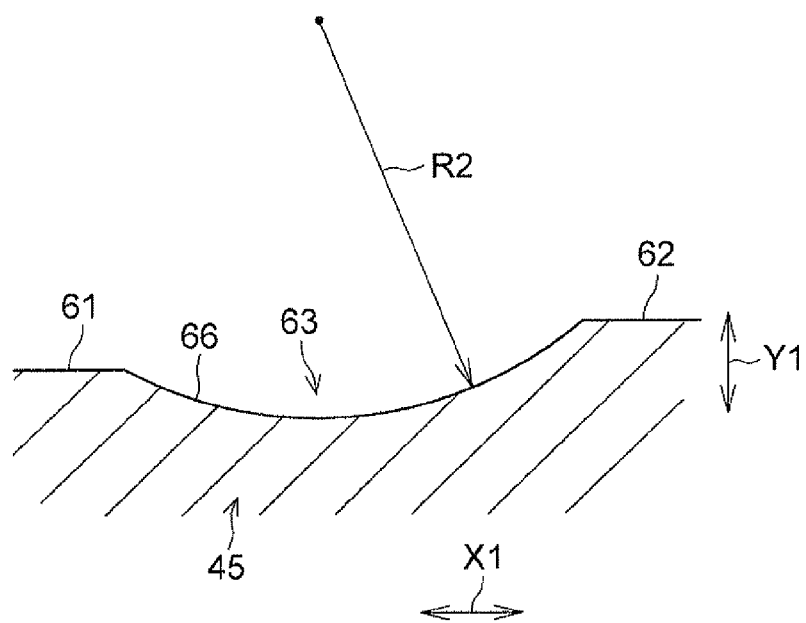
FIG. 7 is a sectional view taken along the line B-B in FIG. 4.

FIG. 4 is a front view of the stepped portion 63 of the first stepped shaft 45 of the steered shaft 6 and its surrounding portions. FIG. 5 is a plan view of the stepped portion 63 of the first stepped shaft 45 of the steered shaft 6 and its surrounding portions. FIG. 6 is a sectional view taken along the line A-A in FIG. 5. FIG. 7 is a sectional view taken along the line B-B in FIG. 4.

The first stepped shaft 45 will be described. The second stepped shaft 46 and the first stepped shaft 45 have a bilateral symmetric relationship. As shown in FIG. 4, one of the contact portions 64 is located above a central axis 6c of the steered shaft 6 in a vehicle height direction Z1, and the other contact portion 64 is located below the central axis 6c in the vehicle height direction Z1. Similarly, one of the first corner portions 65 is located above the central axis 6c of the steered shaft 6 in the vehicle height direction Z1, and the other first corner portion 65 is located below the central axis 6c in the vehicle height direction Z1.

As shown in FIG. 6, the first corner portion 65 connects the first outer peripheral face 61 to an inner end 64a of the contact portion 64. The first corner portion 65 has a concave curve sectional shape with a relatively small curvature radius R1 in a cross section taken along the axial direction X1. The first corner portion 65 is recessed toward the central axis 6c of the steered shaft 6, with respect to the first outer peripheral face 61.

As shown in FIG. 5, one of the second corner portions 66 is located in front of the central axis 6c of the steered shaft 6 in a vehicle longitudinal direction Y1, and the other second corner portion 66 is located behind the central axis 6c in the vehicle longitudinal direction Y1. The second corner portion 66 connects the first outer peripheral face 61 to the second outer peripheral face 62. As shown in FIG. 7, the second corner portion 66 has a concave curved sectional shape with a relatively large curvature radius R2 in a cross section taken along the axial direction X1 of the steered shaft 6. The curvature radius R2 of the second corner portion 66 is larger than the curvature radius R1 of the first corner portion 65.

As described above, one of the first corner portions 65 is located above the central axis 6c of the steered shaft 6 in the vehicle height direction Z1 and the other first corner portion 65 is located below the central axis 6c in the vehicle height direction Z1, and one of the second corner portions 66 is located in front of the central axis 6e of the steered shaft 6 in the vehicle longitudinal direction Y1 and the other second corner portion 66 is located behind the central axis 6c in the vehicle longitudinal direction Y1. Therefore, the second corner portions 66 are arranged at positions which are different from the positions of the first corner portions 65 in the circumferential direction C1 of the steered shaft 6. Therefore, each stepped portion 6 constitutes an odd-form stopper of which the shape is not constant in the circumferential direction C1 of the steered shaft 6.

Figure 8:
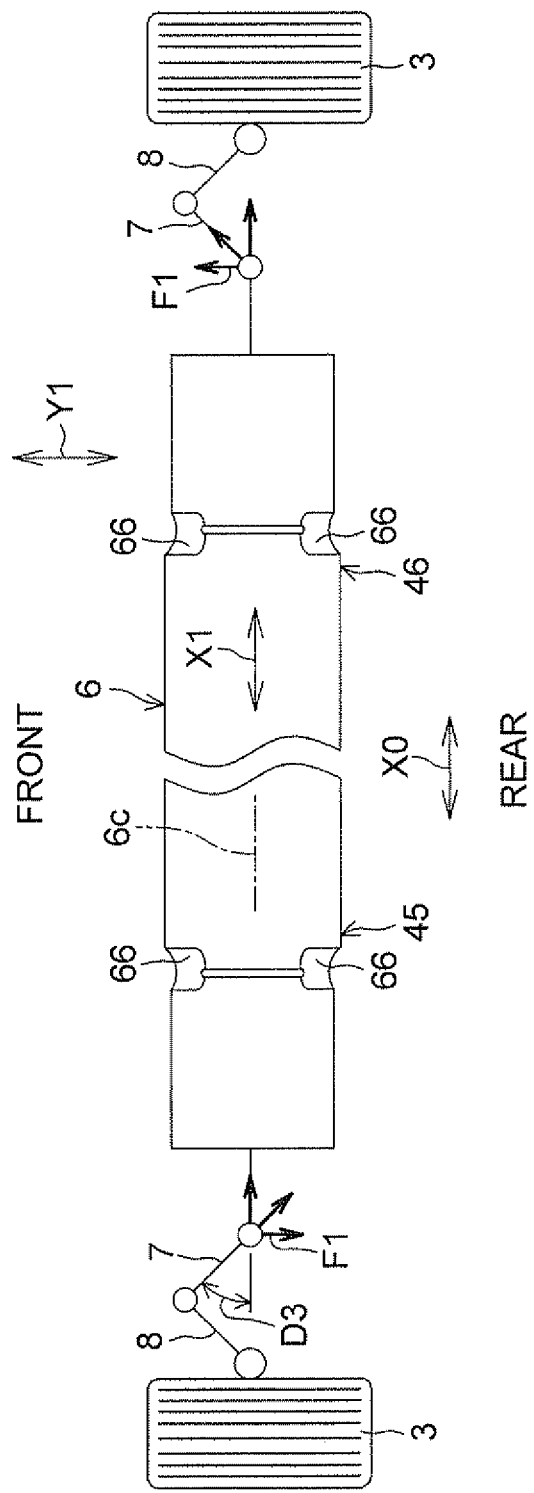
FIG. 8 is a schematic view for describing radial loads applied to the steered shaft.

FIG. 8 is a schematic view for describing radial loads applied to the steered shaft 6. Hereinafter, description will be provided with reference to FIG. 2 and FIG. 8. A drive force (rotational force) from the steered system actuator 4 is converted into a linear force for moving the steered shaft 6 in the axial direction X1 by the ball screw mechanism 23. As a result, the steered shaft 6 linearly moves in the axial direction X1. The linear movement of the steered shaft 6 is transmitted to the tie rods 7 arranged so as to project from respective ends of the steered shaft 6, and causes pivot motions of the knuckle arms 8. At this time, the steered shaft 6 receives reaction forces from the tie rods 7. For example, as shown in FIG. 8, when the steered shaft 6 moves to the left, the left tie rod 7 is pushed by the steered shaft 6, and the right tie rod 7 is pulled by the steered shaft 6. Therefore, a reaction force directed to the diagonally backward right is applied from the left tie rod 7 to the steered shaft 6, and a reaction force directed to the diagonally forward right is applied from the right tie rod 7 to the steered shaft 6.

In the present embodiment, a tie rod angle D3 (see FIG. 8) is set to a large value of, for example, 30 degrees or larger. Therefore, as shown by arrow F1 in FIG. 8, the reaction force that the steered shaft 6 receives from the tie rod 7 contains a relatively large radial component (hereinafter, referred to as "radial component F1"). The direction in which the tie rod 7 extends is substantially constant regardless of the steered angle. Therefore, the direction of the radial load is a certain direction. That is, the direction of the radial load is a forward direction or a backward direction. The radial load is applied to the steered shaft 6 as a bending load, and bending stress is generated at a front side portion and a rear side portion of the stepped portion 63. The second corner portions 66 each having a curvature radius larger than that of the first corner portion 65 are formed in the front side portion and the rear side portion.

As described above, in the present embodiment, the contact portions 64 formed in each of the stepped portions 63 of the steered shaft 6 are brought into contact with a corresponding on of the stoppers 47, 48, so that the amount of movement of the steered shaft 6 is restricted. As described above, when the steered shaft 6 is steered, the radial load is applied to the steered shaft 6. The direction of this radial load is a certain direction. Further, as the radial load is applied to the steered shaft 6, stress is generated at certain sections of the stepped portion 63. In regions including such sections, the second corner portions 66 having a relatively large curvature radius are formed. Therefore, stress concentration at the steered shaft 6 is suppressed, and stress in the steered shaft 6 is reduced. Consequently, the durability of the steered shaft 6 is enhanced.

In the present embodiment, in each of the stepped portion 63, one of the second corner portions 66 is located in front of the central axis 6c of the steered shaft 6, and the other second corner portion 66 is located behind the central axis 6c. That is, the second corner portions 66 are formed in the front side portion and the rear side portion of the steered shaft 6, respectively. Therefore, regardless of whether the radial load applied to the steered shaft 6 is a forward radial load or a backward radial load, the stress in the second corner portions 66 is reduced.

In the present embodiment, each of the first corner portions 65 is recessed toward the central axis 6e of the steered shaft 6, with respect to the first outer peripheral face 61. In this configuration, the area of each contact portion 64 is made larger than that in a configuration where each first corner portion projects outward from the first outer peripheral face. Therefore, the stress that is generated in each contact portion 64 when the contact portion 64 comes into contact with the first stopper 47 is reduced, and the stress in the steered shaft 6 is reduced. Further, an increase in size of the vehicle steering system 1 is suppressed.

In the present embodiment, the stepped portions 63 and the stoppers 47, 48 are arranged in the inner space 5b of the steered housing 5, which is hermetically sealed by the first seal 49 and the second seal 50. Therefore, it is possible to prevent foreign matter from entering spaces between the stepped portions 63 and the stoppers 47, 48. As a result, it is possible to prevent foreign matter from being caught between the contact portions 64 of the steered shaft 6 and the stoppers 47, 48. Therefore, in a vehicle steering system in which the tie rod angle is large and no bellows are provided, for example, in a vehicle steering system which is disposed in a material-handling vehicle such as a fork lift, the durability of the steered shaft 6 is enhanced.

In the present embodiment, the stepped portion 63 of the first stepped shaft 45 is located inward of the first stopper 47 in the vehicle lateral direction X0. Similarly, the stepped portion 63 of the second stepped shaft 46 is located inward of the second stopper 48 in the vehicle lateral direction X0. In this configuration, the distance from each end of the steered shaft 6 to the corresponding stepped portion 63 is made longer than that in a configuration where stepped portions are located outward of stoppers in the vehicle lateral direction X0. As a result, it is possible to further reliably prevent foreign matter from being caught between the stepped portions 63 and the first and second stoppers 47, 48.

One embodiment of the invention has been described above. However, the invention is not limited to the above-described embodiment, and various changes may be made within the scope of the claims. For example, in the above-described embodiment, one of the second corner portions 66 is formed in front of the central axis 6c of the steered shaft 6, and the other second corner portion 66 is formed behind the central axis 6c. Alternatively, the second corner portion may be formed in front of or behind the central axis 6c.

In the above-described embodiment, the first corner portion 65 is formed of a curved face having the single curvature radius R1. Alternatively, the first corner portion 65 may be formed of a curved face having a plurality of curvature radii. Similarly, the second corner portion 66 may be formed of a curved face having a plurality of curvature radii. When at least one of the first corner portion 65 and the second corner portion 66 has a plurality of curvature radii, the minimum curvature radii of the portions having the plurality of curvature radii are compared with each other to determine which of the portions has a larger curvature radius. For example, when each of the first corner portion and the second corner portion has a plurality of curvature radii, the minimum curvature radius of the second corner portion should be larger than the minimum curvature radius of the first corner portion.

The above-described embodiment is applied to the steering system of a steer-by-wire type in which the steered shaft 6 is driven according to an electric signal issued in response to an operation of the steering member. Alternatively, the above-described embodiment may be applied to a steering system in which the steered shaft 6 is mechanically coupled to a steering member.

What is claimed is:

1. A vehicle steering system, comprising:
   a steered shaft that moves in an axial direction of the steered shaft in response to an operation of a steering member; and
   a stopper that comes into contact with the steered shaft to restrict an amount of movement of the steered shaft in the axial direction, wherein
   the steered shaft has a first outer peripheral face, a second outer peripheral face that is larger in diameter than the first outer peripheral face and that is coaxial with the first outer peripheral face, and a stepped portion that connects the first outer peripheral face to the second outer peripheral face, and
   the stepped portion has
   a contact portion that faces the stopper in the axial direction,
   a first corner portion that has a concave curved sectional shape, and that connects the first outer peripheral face to an inner end of the contact portion, and
   a second corner portion that has a concave curved sectional shape with a curvature radius larger than a curvature radius of the first corner portion, that is formed in at least one of a position in front of a central axis of the steered shaft and a position behind the central axis in a longitudinal direction of a vehicle, the position being different from a position of the first corner portion in a circumferential direction of the steered shaft, and that connects the first outer peripheral face to the second outer peripheral face.

2. The vehicle steering system according to claim 1, wherein the second corner portion is formed in each of the position in front of the central axis of the steered shaft and the position behind the central axis.

3. The vehicle steering system according to claim 1, wherein the first corner portion is recessed toward the central axis of the steered shaft, with respect to the first outer peripheral face.

4. The vehicle steering system according to claim 1, further comprising:
   a tubular steered housing that surrounds a periphery of the steered shaft; and
   a seal that is disposed between each end portion of the steered housing and the steered shaft in the axial direction, and that hermetically seals an inside of the steered housing,
   wherein the stopper and the stepped portion are arranged in the inside of the steered housing, which is hermetically sealed by the seal.

5. The vehicle steering system according to claim 1, wherein the stepped portion is arranged inward of the stopper in a lateral direction of the vehicle.

* * * * *